Patented Sept. 3, 1929.

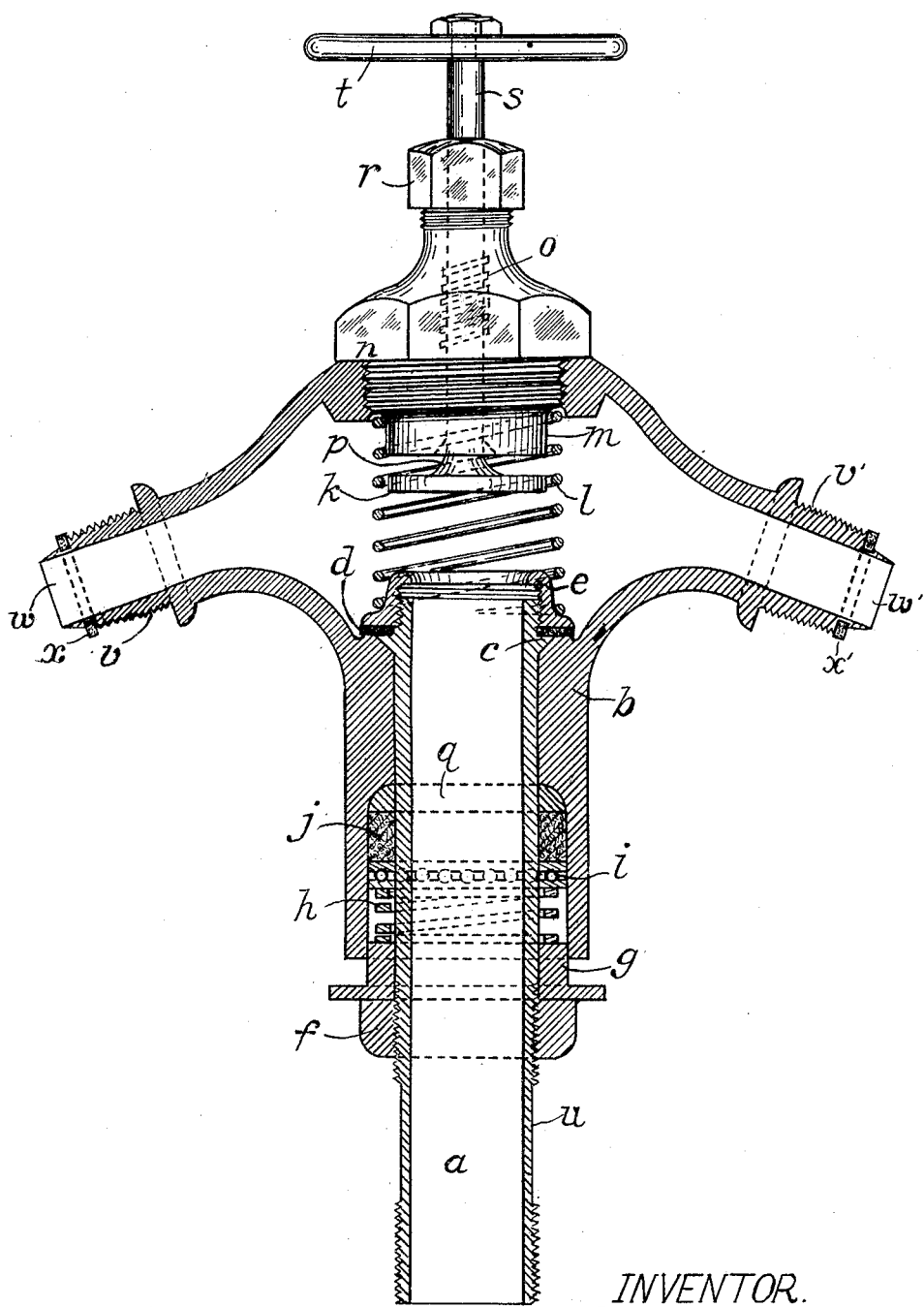

1,727,301

UNITED STATES PATENT OFFICE.

OLIN F. RUSSELL, OF LOS ANGELES, CALIFORNIA.

VALVE.

Application filed December 29, 1925. Serial No. 78,119.

My invention relates to improvements in valves, and particularly to that class of valves to which garden hoses may be attached; and the objects of my improvements are to provide a valve which may be readily turned by the hose as it is moved about, which prevents kinking or breaking the hose at the hydrant.

A further object is to provide one or more spigots so that one or more hoses may be used from one valve at the same time.

A further object is to provide a removable valve-seat, so that when a valve-seat becomes pitted or damaged it may be replaced by a new one.

Another object is to provide a means on the end of the valve spigot to hold the gasket which helps to form a water tight joint at the hose coupling. With this arrangement the gasket is held on the spigot instead of in the hose connection where it is apt to be lost.

Other objects and advantages will appear later in the specification.

The figure of the drawing is a vertical section of the invention.

The valve is provided with threads on the lower end of the short pipe —a— by means of which it is to be connected in the usual manner to a water pipe.

The outer member —b— of the valve is adapted to turn so that the spigots —v— or —v'— will point in the direction of the hose at all times. The outer member is adapted to turn freely so that, as the hose is moved about, instead of the hose buckling or breaking near the coupling to the valve as is frequently the case, the spigot will assume the direction of the hose, thereby eliminating this trouble.

The upper part of the short pipe —a— is provided with a beveled shoulder —c— which together with gasket —d— and the lower flanged end of the removable valve seat —e— helps to form a water tight joint between the stationary member —a— and the movable outer member —b—.

A coil spring —l— is provided which helps to hold the member —b— from sliding downward on the member —a—. It also helps to hold the valve-seat —e— in place.

The valve cap-plug —n— is provided with a core —m— which serves as a guide for the spring —l—; it is also provided with a beveled seat at its lower end so that when the valve-stem —s— is screwed upward the beveled part —p— of the stem will engage it to form a water tight joint and prevent leakage past the valve-stem.

A stuffing-box is provided at the lower end of the movable member —b— in which is held a washer —q—, preferably of a quarter round cross section, the lower side of which acts as a friction-ring for the packing —j—. The packing is pressed in place by a nut —f— forcing the gland —g— against a coil-spring —h—, and a thrust bearing —i— is interposed between the spring —h— and the packing —j—. This arrangement forms a water tight joint and it also helps to hold the seat of the movable member —b— against the shoulder —c—.

A space at —u— on the outside of the short pipe —a— is constructed to receive a wrench when coupling the valve to a water-pipe and is preferably made hexagon in shape.

The ends of spigots —v— and —v'— are grooved to receive gaskets —x— and —x'—. The ends —w— and —w'— are tapered so that they will enter the sleeve of the female hose connection.

The thread on the stem —s— for lowering and raising the valve-gasket —k— is shown at —O—. The nut —r— is of the common type and contains a packing in the usual manner, and —t— is a valve handle of any preferred kind.

What I claim is:

1. A valve comprising a stationary inlet member provided with a beveled flange, a relatively movable discharge member adapted to turn thereon, and means to maintain water tight joints between the stationary and movable members.

2. A valve comprising a stationary inner inlet member, a relatively movable outer discharge member, a packing and packing gland provided between the outer and inner members, a packing-nut, and spring means adapted to press the outer and inner members together at their seat.

3. A valve comprising a stationary inlet member provided with a flange near its inner end, a relatively movable discharge member adapted to turn thereon, a gasket retained between said flange and a shoulder on the discharge member, and means to prevent the revolvable discharge member from moving longitudinally.

4. A valve including a stationary inlet member provided with a beveled flange near its inner end, a relatively movable discharge member revolvably mounted thereon, a collar secured to the stationary member just below the revolving member to prevent longitudinal movement of the revolving member and to form a packing gland and packing between said collar and revolving member.

5. A valve including a stationary inlet member provided with a beveled flange near its inner end, a revolvably mounted outlet member provided with one or more spigots, gasket retaining means provided at the outer end of the spigots, means to prevent longitudinal movement of the revolvable outlet member, and means to maintain water tight joints between the movable and stationary members.

6. A valve including a stationary inlet member provided with a flange near its inner end, a revolvably mounted outlet member provided with one or more spigots, gasket retaining means provided at the outer ends of the spigots, and a spring means adapted to hold a removable valve seat into engagement with the inner end of the stationary inlet member and to press a gasket over the joint between the stationary and movable members.

7. A valve including a stationary inlet member provided with a flange near its inner end, a revolvably mounted outlet member provided with one or more spigots, gasket retaining means provided at the outer ends of the spigots, a spring means adapted to hold a removable valve seat into engagement with the inner end of the stationary inlet member and to press a gasket over the joint between the stationary and movable members, a packing and packing ring, a ball bearing and coil spring, and a collar secured to the stationary member and bearing against said spring to form a packing gland and to prevent longitudinal movement of the revolvable member.

OLIN F. RUSSELL.